(12) United States Patent
Behrendt et al.

(10) Patent No.: US 10,115,980 B2
(45) Date of Patent: Oct. 30, 2018

(54) COOLING MODULE FOR A FUEL CELL

(71) Applicant: Volkswagen AG, Wolfsburg (DE)

(72) Inventors: Reiner Nico Behrendt, Wolfsburg (DE); Benno Andreas-Schott, Triangel (DE)

(73) Assignee: Volkswagen AG, Wolfsburg (DE)

( * ) Notice: Subject to any disclaimer, the term of this patent is extended or adjusted under 35 U.S.C. 154(b) by 344 days.

(21) Appl. No.: 15/094,448

(22) Filed: Apr. 8, 2016

(65) Prior Publication Data
US 2016/0308226 A1 Oct. 20, 2016

(30) Foreign Application Priority Data
Apr. 14, 2015 (DE) ........................ 10 2015 206 633

(51) Int. Cl.
*H01M 8/04* (2016.01)
*H01M 8/02* (2016.01)
*H01M 8/04044* (2016.01)
*H01M 8/04029* (2016.01)
*H01M 8/1018* (2016.01)

(52) U.S. Cl.
CPC ... *H01M 8/04044* (2013.01); *H01M 8/04029* (2013.01); *H01M 2008/1095* (2013.01); *H01M 2250/20* (2013.01); *Y02T 90/32* (2013.01)

(58) Field of Classification Search
CPC .............. H01M 8/04; H01M 8/04044; H01M 8/04029; H01M 8/10; H01M 8/1018
See application file for complete search history.

(56) References Cited

U.S. PATENT DOCUMENTS

| 4,895,905 A | 1/1990 | Schneider et al. |
| 5,855,790 A | 1/1999 | Bradburry |
| 2003/0193009 A1* | 10/2003 | Dill ................... H01M 8/04029 250/206 |
| 2004/0191586 A1 | 9/2004 | Matsuzaki |
| 2004/0253490 A1 | 12/2004 | Wulff et al. |
| 2013/0168322 A1 | 7/2013 | Uyama et al. |
| 2013/0309585 A1 | 11/2013 | Beylich et al. |

FOREIGN PATENT DOCUMENTS

| DE | 3704307 | 8/1988 |
| DE | 10201276 | 7/2003 |
| DE | 602004003847 | 5/2007 |
| DE | 102009037080 | 2/2011 |
| DE | 102011009917 | 8/2012 |
| DE | 102011009923 | 8/2012 |

* cited by examiner

Primary Examiner — Kenneth J Douyette
(74) Attorney, Agent, or Firm — Davidson, Davidson & Kappel, LLC

(57) ABSTRACT

A cooling module (2) for a fuel cell (1) including a cooling circuit (3) for conducting a coolant, and a treatment unit (10) for the coolant, which is situated in the cooling circuit (3) in such a way that the coolant flowing in the cooling circuit (3) flows through it. The treatment unit (10) includes a filter medium (11) for removing metal ions from the coolant which includes a polymer having amidoxime and/or hydroxamic acid groups and is in contact with the coolant.

19 Claims, 4 Drawing Sheets

COOLING MODULE FOR A FUEL CELL

This claims the benefit of German Patent Application DE 10 2015 206 633.9, filed Apr. 14, 2015 and hereby incorporated by reference herein.

The present invention relates to a cooling module for a fuel cell, including a cooling circuit for conducting a coolant, and a treatment unit for the coolant, which is situated in the cooling circuit in such a way that the coolant flowing in the cooling circuit flows through it.

BACKGROUND

Fuel cells are devices in which a fuel, such as methanol, ethanol, hydrogen or corresponding mixtures, may be burned in a controlled manner using an oxidizing agent, such as pure oxygen, air, chlorine or bromine gas, the reaction energy released in the process being converted into electrical energy. Such fuel cells have been used to generate electrical energy for several decades. Due to their high efficiency, their low or completely absent harmful substance emission, and their low noise development during operation, the interest in the use of fuel cells has risen drastically in many fields in recent years. In particular the vehicle and power plant fields shall be mentioned in this regard.

Fuel cells are typically classified according to the type of the electrolyte which separates the anode and cathode chambers from each other. A particularly interesting fuel cell type, which is suitable in particular for use in smaller power plants and for mobile use (as an energy source for the electric motor vehicle drive, for example), is the polymer electrolyte fuel cell. This type of fuel cell uses an ion-conducting membrane as the electrolyte. A single solid polymer fuel cell generally includes a so-called membrane electrode assembly (MEA), in which an ion-conducting membrane is situated between a cathode and an anode. The ion-conducting membrane simultaneously serves as a partition and as the electrolyte. Catalyst particles, which promote the conversion reactions in the fuel cell, are situated at the boundary between the electrodes and the membrane. The electrodes are typically in contact with porous current collectors, which additionally stabilize the electrode structure and allow fuels to be supplied. Since the operating voltage of a single cell is normally less than 1 volt, most fuel cells are made up of a cell stack, in which numerous individual cells stacked on top of each other are connected in series to generate a higher voltage.

Since the electrochemical reaction between the fuels takes place exothermically, the fuel cell usually must be cooled so that the desired operating temperature may be maintained and damage to the membrane may be avoided. Since a relatively large amount of heat having only a small temperature difference compared to the ambient temperature must be dissipated, typically liquid coolants are used which have a sufficiently high heat capacity. For this reason, aqueous coolants are particularly well-suited. In general, mixtures of water and ethylene glycol are used as antifreeze agents, as they are known for cooling internal combustion engines. To prevent metallic components of the cooling circuit and of the fuel cell from corroding, the coolants in general additionally contain non-ionic corrosion inhibitors.

A special characteristic of fuel cell cooling is the requirement of a very low electrical conductivity of the coolant to counteract the risk of electrical short circuits between the individual cells of the fuel cell stack. A coolant made of deionized water, glycol, non-ionic corrosion inhibitors and other additives is used for this purpose.

If deionized water is used as the coolant, this may simultaneously be used to humidify the reactants flowing into the fuel cell in order to ensure sufficient humidification of the polymer membrane. Depending on operating conditions, it may be necessary to add an antifreeze agent, such as ethylene glycol, or other additives, to the cooling water. However, the materials installed in the cooling system and in the fuel cell introduce ions into the coolant, which increase its electrical conductivity. To counteract this effect, deionization devices having ion exchange resins are used, around which the coolant flows. The ion exchange resins take up ions (cations and anions) dissolved in the coolant and give off $H^+$ and $OH^-$ ions, which combine again to form $H_2O$.

Ion exchangers for cooling media of fuel cells are known, for example, in granular form in ion exchanger cartridges from DE 10 2009 0370 080 A1, DE 10 2011 009 923 A1, and DE 10 2011 009 917 A1. Moreover, a liquid deionizing agent is proposed in DE 102 01 276 A1, which is admixed to the coolant and is separated from the coolant after the ion exchange with the aid of a phase separator.

SUMMARY OF THE INVENTION

The known ion exchangers, however, have the disadvantage that the necessary cartridges are usually situated externally on the cooling circuit of the fuel cell, and thus require additional storage space. To reduce this space, frequently only a portion of the coolant flow is conducted through the ion exchanger, and thus the piping and space requirements are reduced.

Moreover, the known granular ion exchange resins show an unfavorable loss of pressure when the coolant flows through. Over the course of use, flow paths form in the granules, as a result of which the load of the ion exchanger increases irregularly, and moreover only an increasingly smaller portion of the coolant is treated.

It is an object of the present invention to provide a cooling module for a fuel cell, which includes a treatment unit which reliably frees the coolant of the cooling module of metal ions with minimal space utilization.

The present invention provides a cooling module for a fuel cell having the features as recited in the first independent claim. A first aspect of the present invention thus relates to a cooling module for a fuel cell, including a cooling circuit for conducting a coolant, and a treatment unit for the coolant, which is situated in the cooling circuit in such a way that the coolant flowing in the cooling circuit flows through it. According to the present invention, the treatment unit includes a filter medium for removing metal ions from the coolant which includes a polymer having amidoxime and/or hydroxamic acid groups and is in contact with the coolant.

The advantage of the cooling module according to the present invention is the integration of the treatment unit into the cooling module, and thus a considerable reduction of the space requirement of the treatment unit compared to conventional ion exchangers. Moreover, the flowing coolant does not undergo any noteworthy loss of pressure when flowing through the cooling module according to the present invention. Nonetheless, metal ions are reliably and permanently removed from the coolant with the aid of the polymer including the functional groups by way of complexing, and thus the electrical conductivity or the conductance value of the coolant is reduced, and consequently the service life of the fuel cell is increased.

According to the present invention, the treatment unit includes a filter medium. The filter medium is situated in the treatment unit in such a way that the coolant flows past the filter medium and comes in contact with its surface and/or the coolant flows through it. The filter medium is preferably situated in a flow path of the coolant through the treatment unit in such a way that the coolant flows through it. This has the advantage that the entire coolant is conducted over the filter medium, and thus the treatment unit operates particularly effectively.

The filter medium of the treatment unit includes functional groups, which are able to bond the ionic substances with the aid of a coordinative bond. A coordinative bond in chemistry is understood to mean a chemical bond in which a cation reacts with a neutral or ionic functional group, also referred to as a ligand, in such a way that the ligand in this case provides a free electron pair for coordinative bonding of the ion. The ligand is thus a Lewis base. Usually, the central cation is bonded (complexed) by a multitude of electron pairs, which are provided by the ligands. The advantage of the coordinative bond, on the one hand, is the high chemical stability, which prevents the bound ions from being replaced by other ions and thus released again. Furthermore, coordinative bonds be designed to have a high selectivity with respect to the ion to be complexed, i.e., the bonding of other ions, such as certain coolant additives, may be prevented. Another advantage of bonding the cations with the aid of coordinative bonds is that in many coordinative bonds no counter metal cation is released by way of the ion exchange mechanism. In this way, the electrical conductivity of the coolant can be reduced particularly effectively.

According to the present invention, the functional groups of the filter medium are amidoxime groups (—C(NH$_2$)=NOH), hydroxamic acid groups (—CO—NHOH) and their mixtures. The above functional groups are characterized in that they have free electron pairs which are suitable for a coordinative bond, i.e., they are Lewis bases. Within the scope of the present invention, amidoxime groups and hydroxamic acid groups are particularly preferred since these are able to particularly selectively bond copper and iron cations.

It is particularly preferred for the filter medium to include, or to be made up of, a polymer which is functionalized with the functional group. Polymers, in particular organic polymers, may be provided particularly easily with multifaceted functional groups by subsequent chemical reaction at their surface. Polyacrylonitrile (PAN) and/or polyacrylic acid ester (PMMA) are particularly preferred polymers. Nitrile groups (—CN) are already present in polyacrylonitrile without subsequent functionalization, which as such are already able to complex cations. Moreover, it is easily possible to chemically convert the nitrile groups into other functional groups, in particular amidoxime groups or hydroxamic acid groups, for example by reacting PAN with hydroxylamine (H$_2$N—OH) or PMMA with hydrazine (H$_2$N—NH$_2$). Polyacrylonitrile moreover is characterized by a high chemical resistance against acids and many organic solvents, and by a high hydrolysis resistance.

Within the scope of the present invention, it is particularly preferred that the filter medium includes polyacrylonitrile and/or polyacrylic acid ester which is provided with functional amidoxime and/or hydroxamic acid groups, for example by the treatment with hydroxylamine or hydrazine. The chemical functionalization of PAN by the treatment with hydroxylamine for creating amidoxime groups is represented in the following equation:

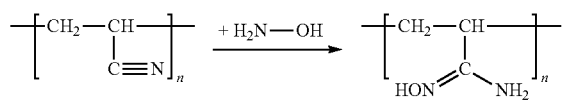

Each amidoxime group has two nitrogen atoms, which each have a free electron pair suitable for complexing a copper or iron ion. Thus a bidentate ligand is involved. Amidoxime groups have a particularly high selectivity for bonding copper and iron cations.

The filter medium preferably includes a base material and a coating on the same, which is provided with the functional groups. This allows conventional filter materials to be used as the base material and to provide these subsequently with a functionalized coating according to the present invention.

The filter medium is preferably present in the form of fibers, in particular in the form of a woven fabric, a scrim, such as a nonwoven or felt, or a membrane through which the coolant is able to flow. Due to the higher specific surface area, a fiber structure is preferred. In the case of a single-layer composition of the filter medium, this layer is only made up of the material bearing the functional groups and is thus implemented in the form of fibers or a permeable membrane. In the case of fibers, it is preferred that these are nanofibers, i.e., fibers having an average diameter of less than 1000 nanometers (nm), in particular at most 500 nm. Nanofibers may be generated in the known manner by electrospinning. In the case of a double-layer filter device, preferably a filamentary base material is used, for example modified cellulose or a synthetic polymer fiber, whose individual fibers or the fiber layer is coated with the functionalized material, in particular the functionalized polymer. The functionalized polymer itself is preferably again present in the form of fibers, preferably as nanofibers. The advantage of configuring the filter medium as fiber material is in particular the ease in handling; for example, the filter medium in the form of fiber materials may be situated directly in the flow path of the coolant within the treatment unit, without requiring a cartridge to prevent mixing or release of the filter medium. This, in turn, facilitates the maintenance or the replacement of the filter medium. Additionally, the use of fiber materials has the advantage of increasing the active surface area of the material and an additional filter action. In addition to ions, particles are thus also removed from the cooling circuit as a function of the composition of the materials.

In one preferred embodiment of the present invention, it is provided that the treatment unit additionally includes a cationic and/or an anionic ion exchanger. In this embodiment, in addition to metal ions, other ions are advantageously also removed from the coolant. The anionic ion exchanger, for example, withdraws acid residue ions from the coolant, for example, and the cationic ion exchanger withdraws alkali and ammonium ions.

The anionic and/or the cationic ion exchanger(s) is/are particularly advantageously also designed as a fiber material, in particular in the form of nanofibers, and/or situated on the same since the active surface area of the ion exchanger is thus increased, and the ion exchangers may be situated directly in the treatment unit without requiring the use of a cartridge or the like.

In one preferred example, it is provided that the ion exchangers are present supported on the filter medium, which is present in polymeric form as a woven fabric, a scrim or a knitted fabric. As an alternative or in addition, the ion exchangers are situated supported on activated, in particular sulfonated, polystyrene (PS) or on glass fibers (CEF).

In a further preferred embodiment of the present invention, it is provided that the treatment unit includes a layer system, including a first layer containing the filter medium in one of the described embodiments and at least one second layer which is situated on the first layer and includes the cationic and/or anionic ion exchanger(s). The arrangement in the layer stack advantageously prevents a mixing of the active substances of the treatment unit and thus ensures that all ions are reliably removed from the cooling water circuit since the cooling water must sequentially penetrate all layers to pass the coolant. Moreover, the arrangement as a layer stack offers considerable manufacturing advantages. The sequence and the number of layers may vary.

The treatment unit according to the present invention preferably has three layers, namely a cationic ion exchanger (cation exchanger), a filter medium (ion-complexing material), and an anionic ion exchanger (anion exchanger). To this end, the sequence of the individual layers is preferably adapted to the ions to be filtered. The middle layer preferably includes the filter medium (ion-complexing material), one ion exchanger being situated on either side of the ion-complexing material, namely one anion exchanger and one cation exchanger. Ions not retained by the ion exchangers as the coolant flows through are then complexed with the aid of the filter medium and thus bonded.

The treatment unit particularly advantageously furthermore includes an optical sensor, which is designed to detect a color change of the filter medium, in particular of the polymer, as a function of its load condition. Surprisingly, it has been found that the filter medium according to the present invention changes color as a function of the ion type as the load condition increases. The colorless to yellowish felt, for example, undergoes a color change to blue-green during the loading with copper ions. The arrangement of an optical sensor, which is designed to detect a color change of the loaded polymer, thus offers the advantage of an individual and reliable determination of the maintenance intervals of the treatment unit at which it is necessary to regenerate and/or replace the filter medium and/or the ion exchangers. In contrast to rigidly established uniform maintenance intervals, this ensures on the one hand that the capacity of the treatment unit is fully exhausted, and ensures a consistently high quality of the treatment of the coolant on the other hand.

A further aspect of the present invention relates to a fuel cell system including a cooling module according to the present invention in one of the described embodiments, and to a motor vehicle including such a fuel cell system.

The various specific embodiments of the present invention described in the present application may advantageously be combined with each other, unless they are designed differently in the individual case.

BRIEF DESCRIPTION OF THE DRAWINGS

The present invention is described hereafter in exemplary embodiments based on the accompanying drawings.

DETAILED DESCRIPTION

Figure 1:
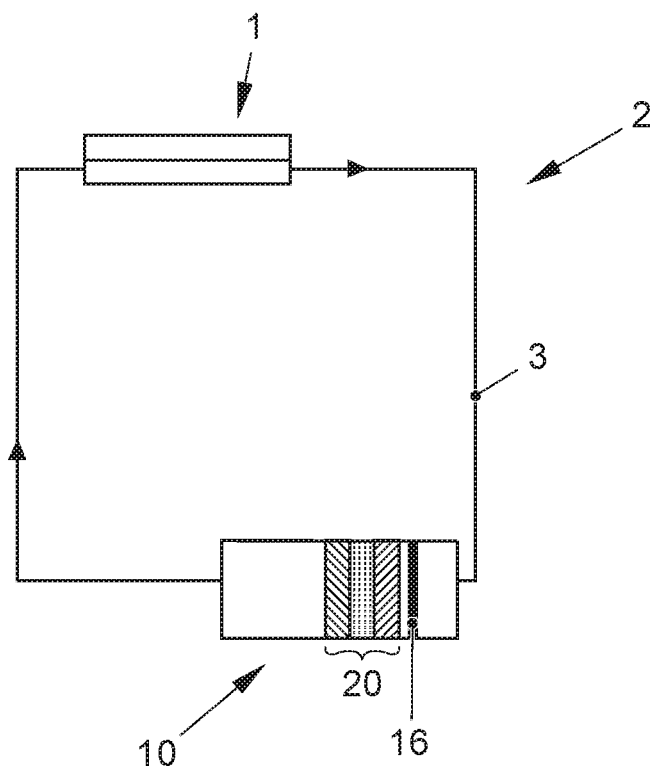
FIG. 1 shows a schematic diagram of a cooling module in one preferred embodiment of the present invention.

FIG. 1 shows a cooling module 2 having a cooling circuit 3, which is connected to a fuel cell 1 in a fluid-conducting manner. A treatment unit 10 is situated in the cooling module. Treatment unit 10 is designed in the form of a container, for example, through which the coolant flows. Within treatment unit 10, a layer system 20 for treating the cooling water is situated in the flow path of the coolant. Treatment unit 10 furthermore includes an optical sensor, which is situated in such a way that it is present in an optical axis with layer stack 20, in particular with a filter medium 11 in layer stack 20, and thus is able to detect a color spectrum of the same.

Figure 2:
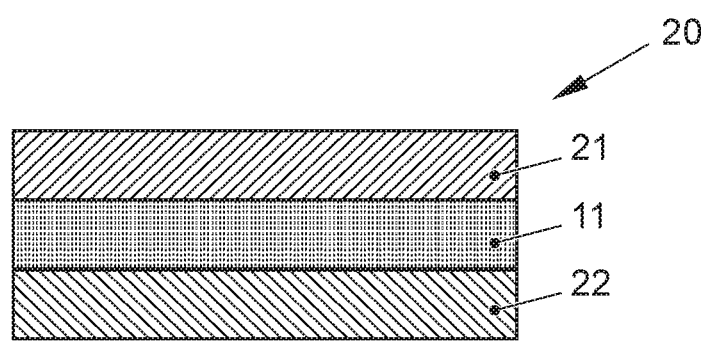
FIG. 2 shows a schematic diagram of a detailed view of a layer stack as part of a treatment unit according to the present invention in the preferred embodiment of the present invention.

FIG. 2 shows a detailed illustration of layer system 20 in one preferred embodiment. In the shown embodiment, the layer system includes three active layers, namely a filter medium 11, on which a cationic ion exchanger 21 and an anionic ion exchanger 22 are situated. Cationic ion exchanger 21 and anionic ion exchanger 22 are optionally situated on filter medium 11.

A preferably water-based coolant flows in cooling module 2 shown in FIG. 1. In general, antifreeze agents, such as ethylene glycol and/or glycerol, and corrosion inhibitors and other additives are furthermore added to the coolant. Ions, in particular metal ions and acid residue ions, are enriched in the coolant when it flows through cooling circuit 3 and fuel cell 1. These undesirably increase the conductance value of the coolant and promote corrosion. When the coolant flows through treatment unit 10, metal ions such as copper and/or iron ions are withdrawn from the coolant by filter medium 11 by way of complexing. If cationic ion exchangers 21 and/or anionic ion exchangers 22 are situated on filter medium 11, additionally anions and cations are exchanged in the coolant when it flows through the treatment unit.

Figure 3:
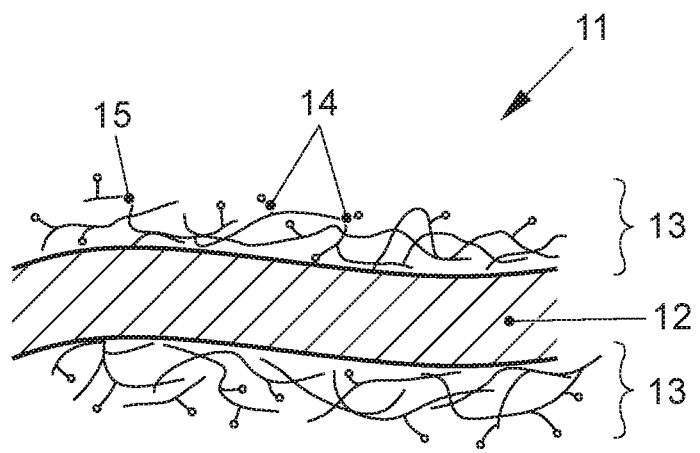
FIG. 3 shows a schematic sectional view of a filter medium according to a first embodiment of the present invention.

FIG. 3 shows a highly enlarged section of a filter medium denoted overall by reference numeral 11 for use in a treatment unit for purifying the coolant.

Filter medium 11 includes a base material 12 in the shown embodiment. In the illustrated embodiment, base material 12 has a fiber structure, FIG. 3 showing the section through a single fiber. Base material 12 is preferably present in the form of a felt or nonwoven. Base material 12 may be made up of cellulose, for example, which is impregnated with a phenolic resin. Alternatively, a synthetic polymer fiber may be used, for example polypropylene or polyethylene terephthalate. Fiber scrims made of synthetic fibers may be produced with the aid of a melt-blown method, for example. The fibers of the base material typically have an average diameter in the range of 10 μm to 1000 μm.

Filter medium 11 furthermore includes a coating 13, which surrounds the fibers of base material 12 or is situated thereon. Coating 13 is designed to chemically bond copper and/or iron cations, preferably by way of a coordinative bond. For this purpose, the coating includes functional groups 14, which are preferably chemical groups having at least one free electron pair for the coordination of cations. These are preferably amidoxime or hydroxamic acid groups, or a mixture of the two. Functional groups 14 are chemically bonded to a polymer 15, which is preferably polyacrylonitrile (PAN) or polyacrylic acid ester (PMMA). Functionalized polymer 15 is preferably present in the form of nanofibers, which occupy the fibers of base material 12 forming coating 13.

Filter medium 11 shown in FIG. 3 may be created by using a fiber scrim of base material 12 and coating the same with polyacrylonitrile nanofibers, which are produced by electrospinning and deposited directly onto the fibers of base material 12. Alternatively, a commercially available PAN filter material may be used (Heimbach company, for example, or the electret filter medium Technostat® from Hollingsworth & Vose company). Thereafter, the material is treated with hydroxylamine, nitrile groups of the polyacrylonitrile present on the surface of the fibers being completely or partially converted into amidoxime groups. The chemical functionalization of PAN may take place with the aid of a method that is described for various polyacrylate fibers, for example, in Abdouss et al. (Abdouss et al.: Preparation and Characteristics of High Efficiency Ion-Exchange Cross-linked Acrylic Fibers, conference paper, Polymer Processing Society 2005), hereby incorporated by reference herein. Optionally, the polymer fibers may additionally be crosslinked, for example by treatment with hydrazine (also described in Abdouss et al.).

Figure 4:
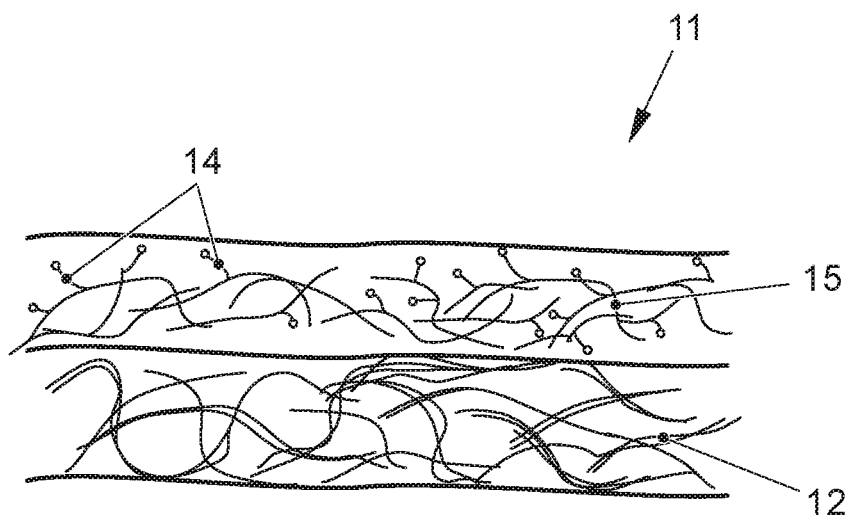
FIG. 4 shows a schematic sectional view of a filter medium according to a second embodiment of the present invention.

FIG. 4 shows an alternative embodiment of a filter medium 11 according to the present invention. In this embodiment, base material 12 and functionalized polymer 15 each form a separate layer of a fiber scrim.

Filter medium 11 represented in FIG. 4 may be created by manufacturing polyacrylonitrile nanofibers by way of an electrospinning method and arranging them to form a fiber scrim (nonwoven). Subsequently, a PAN nonwoven or a PMMA nonwoven is treated as described above, for example with hydroxylamine or hydrazine, to obtain PAN or PMMA 15 functionalized with amidoxime or hydroxylamine groups 14. Fiber medium 11 is achieved by simply placing the two nonwovens on top of each other, which if need be may also be glued to each other.

Filamentary filter materials having weights per unit area in the range of 10 g/m$^2$ to 800 g/m$^2$, a thickness of 0.1 mm to 5 mm, and an air permeability of 20 l/dm$^2$*min to 400 l/dm$^2$*min at 200 Pa inflow pressure have proven to be suitable filter media for the described purpose. A particularly suited base material within the meaning of the present invention, which is later modified within the meaning of the present invention, is the PAN needle felt from Heimbach® (type: 876 A31 5/5). It is 2.6 mm thick, has a weight per unit area of 500 g/m$^2$, and has an air permeability of 140 l/dm$^2$*min at 200 Pa inflow pressure.

Filter medium 11 according to FIG. 3 or 4 may be used in the form of a nonwoven in a treatment unit for purifying a coolant.

Figure 5:
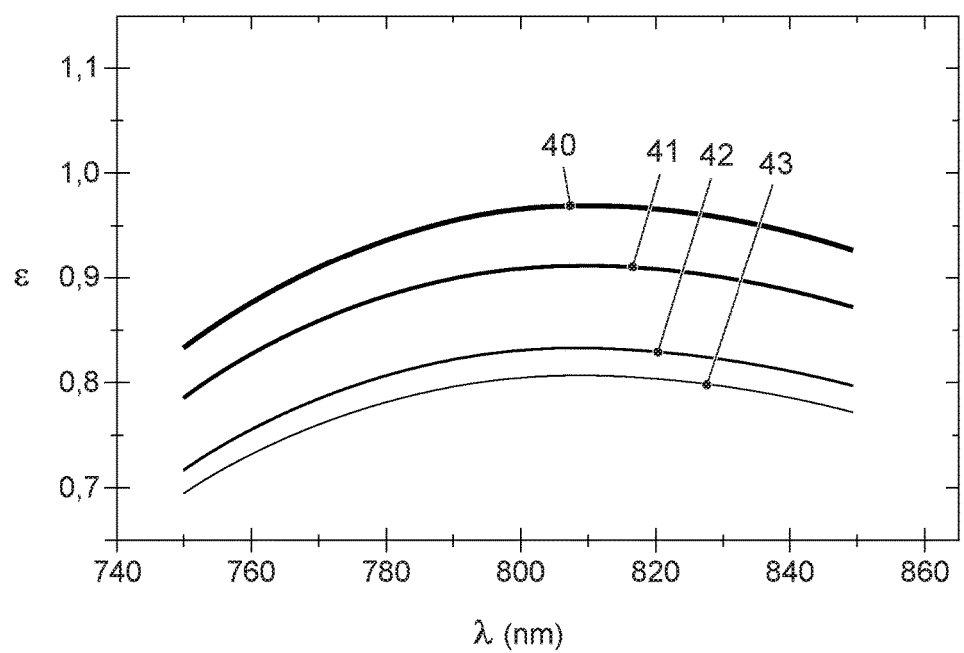
FIG. 5 shows a UV-Vis spectrum of a filter unit loaded with copper ions according to one embodiment of the present invention compared to the UV-Vis spectrum of an unfiltered copper sulfate starting solution.

FIG. 5 shows the extinction c of a filter medium according to the present invention in relation to the wavelength of the light in the form of a UV-Vis spectrum. Based on the change of the UV-Vis absorption, it is possible to determine the concentration change of metal ions in solutions. In this way, UV-Vis measurements may be used to track the success of the metal ion removal from solutions by the filter medium according to the present invention. Initially, a UV-Vis reference measurement was carried out on a copper sulfate solution having a concentration of 5 g/l (40). 100 ml of the copper sulfate solution was filtered over a piece of PAN nonwoven (Heimbach type: 876 A31 5/5; 2.6 mm thick; weight per unit area of 500 g/m$^2$; air permeability of 140 l/dm$^2$*min at 200 Pa inflow pressure), measuring 15 cm×15 cm, which was previously treated with hydroxylamine. The felt piece was modified by initially dissolving 125 g hydroxylamine hydrochloride in 2.51 distilled water at 80° C. The PAN felt piece was immersed into the solution at 80° C. for 2 hours. Thereafter, a neutralization was carried out using sodium hydrogen carbonate until foaming could no longer be observed. Then, the nonwoven was removed. Subsequently, the nonwoven was rinsed three times with distilled water and dried for 2 days at room temperature, the PAN nonwoven taking on an intensive yellow coloration. This nonwoven was then used to detect the absorption of metal ions (based on copper ions) with the aid of UV-Vis spectroscopy. 41 shows the extinction after the first rinsing pass, 42 shows the extinction after the second rinsing pass, and 43 shows the extinction after the third rinsing pass. Loading the modified nonwoven with copper ions causes the filter medium to undergo the color change from yellow to dark blue-green shown in FIG. 5. FIG. 5 also shows illustrations of the discolored nonwovens.

Figure 6:
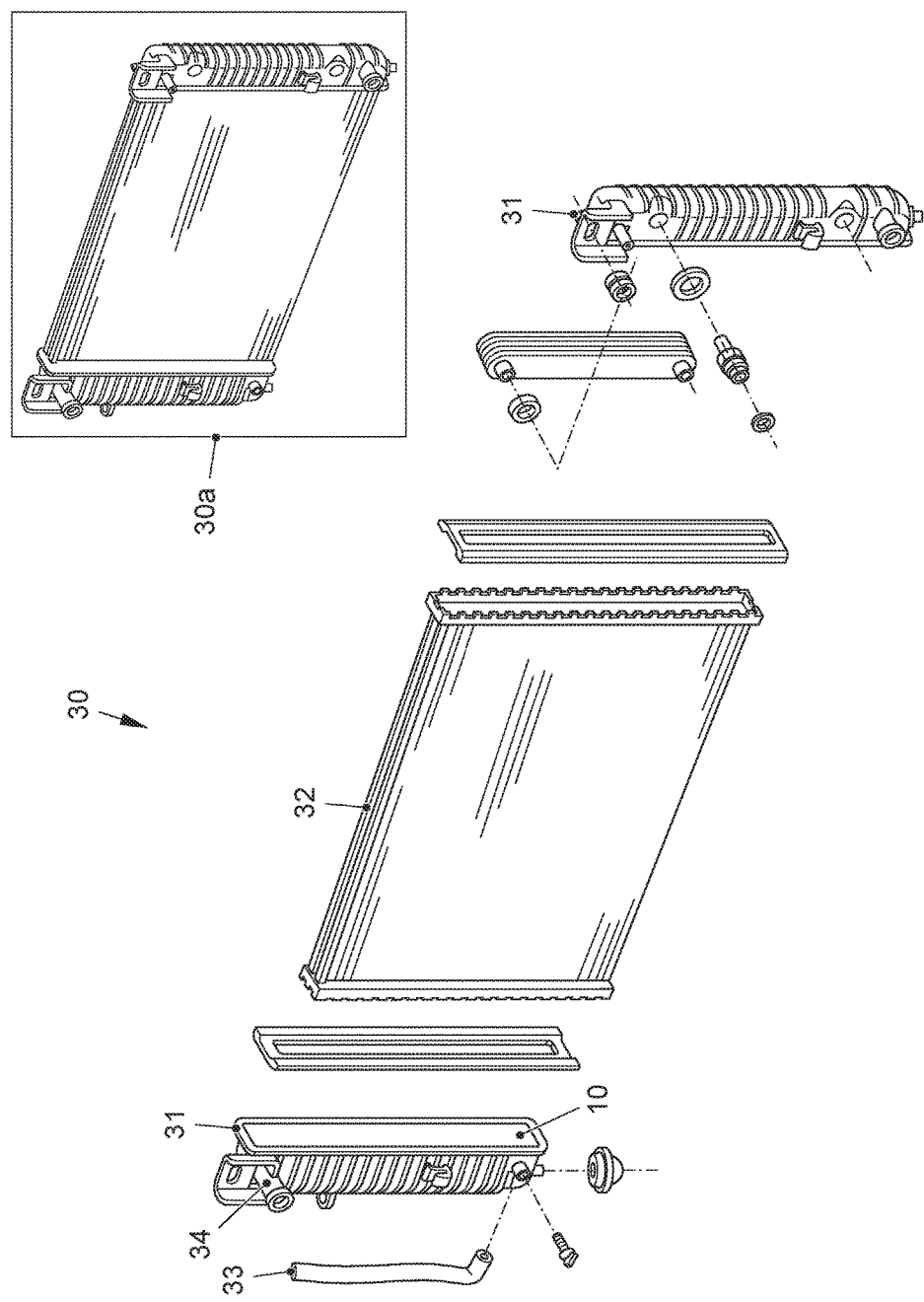
FIG. 6 shows an exploded view of a cooling unit as part of a cooling module according to the present invention.

FIG. 6 shows an exploded view of a cooling unit 30 as part of a cooling module according to the present invention. This essentially corresponds to a vehicle radiator (detail 30a), as it is used in smaller dimensions in a fuel cell system.

Cooling unit 30 includes a heat exchanger 32, which in turn includes a flow channel for coolants and is delimited by two end caps 31. The end caps take up at least the portion of the flow path of the coolant in which the flow path experiences a flow reversal. One of end caps 31 is connected via a feed pipe 33 to the cooling circuit, which is not shown, in a fluid-conducting manner. The other or the same end cap 31 furthermore includes a discharge pipe 34, which is also connected to the cooling circuit in a fluid-conducting manner. Treatment unit 10 according to the present invention is situated in at least one of end caps 31.

During operation of cooling unit 30 in the cooling module of a fuel cell, the coolant flows via feed pipe 33 into one of end caps 31 and from there into heat exchanger 32. It flows through treatment unit 10, depending on the configuration of treatment unit 10 at least the metal ions being complexed by the filter medium and thus withdrawn from the coolant. During every flow reversal in an end cap 31, which includes a treatment unit 10 within the meaning of the present invention, the coolant flows through the treatment unit and is again freed of ions until the coolant finally leaves cooling unit 30 through discharge pipe 34 and is recirculated into the cooling circuit.

LIST OF REFERENCE NUMERALS 1 fuel cell
2 cooling module
3 cooling circuit
10 treatment unit
11 filter medium
12 base material
13 coating
14 functional groups
15 functionalized polymer
16 sensor
20 layer system
21 cationic ion exchanger
22 anionic ion exchanger 30 cooling unit
30a composite representation
31 end cap
32 heat exchanger
33 feed pipe
34 discharge pipe
40 UV-Vis spectrum of a copper sulfate solution (5 g copper sulfate/1 liter water) as reference
41 UV-Vis spectrum of the filtrate after 1st pass over the nonwoven according to the present invention
42 UV-Vis spectrum of the filtrate after 2nd pass over the nonwoven according to the present invention
43 UV-Vis spectrum of the filtrate after 3rd pass over the nonwoven according to the present invention

What is claimed is:

1. A cooling module for a fuel cell comprising:
a cooling circuit for conducting a coolant; and
a treatment unit for the coolant, the treatment unit situated in the cooling circuit in such a way that the coolant flowing in the cooling circuit flows through the treatment unit,
the treatment unit includes a filter medium for removing metal ions from the coolant which includes a polymer having amidoxime or hydroxamic acid groups and is in contact with the coolant, an entirety of the coolant in the cooling circuit flowing through the filter medium.

2. The cooling module as recited in claim 1 wherein the filter medium is a fiber material.

3. The cooling module as recited in claim 2 wherein the fiber material is a woven fabric, a scrim, a knitted fabric, or a membrane.

4. The cooling module as recited in claim 1 wherein the treatment unit includes a cationic or an anionic ion exchanger.

5. The cooling module as recited in claim 4 wherein the cationic or the anionic ion exchanger includes fibers.

6. The cooling module as recited in claim 4 wherein the cationic or the anionic ion exchanger includes nonfibers.

7. The cooling module as recited in claim 4 wherein the treatment unit includes a layer system, the layer system including a first layer containing the filter medium and at least one second layer situated on the first layer and including the cationic or the anionic ion exchanger.

8. The cooling module as recited in claim 1 wherein the treatment unit includes an optical sensor configured to detect a color change of the filter medium as a function of a load condition.

9. A fuel cell system comprising:
the cooling module as recited in claim 1.

10. A vehicle comprising the fuel cell system as recited in claim 9.

11. The cooling module as recited in claim 1 wherein the filter medium includes a base material and a coating.

12. The cooling module as recited in claim 1 wherein the filter medium includes nanofibers.

13. The cooling module as recited in claim 12 wherein the nanofibers have an average diameter of at most 500 nm.

14. A cooling module for a fuel cell comprising:
a cooling circuit for conducting a coolant; and
a treatment unit for the coolant, the treatment unit situated in the cooling circuit in such a way that the coolant flowing in the cooling circuit flows through the treatment unit,
the treatment unit includes a layer system, the layer system including a first layer with cationic ion exchanger or anionic ion exchanger, and a second layer in contact with the first layer and with a filter medium for removing metal ions from the coolant which includes a polymer having amidoxime or hydroxamic acid groups and is in contact with the coolant.

15. The cooling module as recited in claim 14 wherein the layer system includes a third layer in contact with the second layer, the third layer being another of the cationic ion exchanger and the anionic ion exchanger.

16. The cooling module as recited in claim 15 wherein an entirety of the coolant in the cooling circuit flows through the layer system.

17. The cooling module as recited in claim 14 wherein an entirety of the coolant in the cooling circuit flows through the layer system.

18. A cooling module for a fuel cell comprising:
a cooling circuit for conducting a coolant; and
a treatment unit for the coolant, the treatment unit situated in the cooling circuit in such a way that the coolant flowing in the cooling circuit flows through the treatment unit,
the treatment unit includes a filter medium for removing metal ions from the coolant which includes a polymer having amidoxime or hydroxamic acid groups and is in contact with the coolant, the filter medium bonding with the metal ions as the coolant flows through the filter medium.

19. The cooling module as recited in claim 18 where in the metal ions include copper and iron cations.

\* \* \* \* \*